US007318496B2

(12) United States Patent
Sahyoun

(10) Patent No.: US 7,318,496 B2
(45) Date of Patent: Jan. 15, 2008

(54) ACOUSTIC RADIATOR WITH A BAFFLE OF A DIAMETER AT LEAST AS LARGE AS THE OPENING OF THE SPEAKER ENCLOSURE TO WHICH IT IS MOUNTED

(76) Inventor: Joseph Y. Sahyoun, 3031 Hopkins Ave., Redwood City, CA (US) 94062

(*) Notice: Subject to any disclaimer, the term of this patent is extended or adjusted under 35 U.S.C. 154(b) by 1207 days.

(21) Appl. No.: 10/123,963

(22) Filed: Apr. 16, 2002

(65) Prior Publication Data

US 2002/0148678 A1 Oct. 17, 2002

Related U.S. Application Data

(60) Provisional application No. 60/284,260, filed on Apr. 17, 2001.

(51) Int. Cl.
*G01G 3/00* (2006.01)

(52) U.S. Cl. ...................................... 181/172; 181/171

(58) Field of Classification Search ................ 181/172, 181/171, 173, 174
See application file for complete search history.

(56) References Cited

U.S. PATENT DOCUMENTS 3,667,568 A * 6/1972 Liebscher .................... 181/156
5,687,247 A * 11/1997 Proni .......................... 381/398

* cited by examiner

*Primary Examiner*—Kimberly Lockett
(74) *Attorney, Agent, or Firm*—Allston L. Jones

(57) ABSTRACT

Several different acoustic radiator designs improve performance over the prior art while providing a larger baffle (cone), a lesser volume of air displaced than by the smaller prior art speaker design, while maintaining the same enclosure mouth diameter and allowing the use of a shallower enclosure. These advantageous are achieved in a variety of ways with several configurations that include: a substantially vertically oriented resilient mount for the baffle (cone) where that resilient mount is entirely beneath the outer edge of the baffle (cone), between the outer rim of the baffle (cone) and the outer flange of the basket; a resilient mount that resembles prior art surround rotated outward by 45° to 70° extending the outer edge of the baffle (cone) outward allowing the use of a larger diameter speaker baffle (cone); and surround mounted to the outer flange of the basket beneath the dome of the surround moving the surround outward from the center of the enclosure allowing for a larger diameter baffle (cone) in an enclosure with the same mouth size than provided by prior art speakers and passive radiators.

56 Claims, 9 Drawing Sheets

ACOUSTIC RADIATOR WITH A BAFFLE OF A DIAMETER AT LEAST AS LARGE AS THE OPENING OF THE SPEAKER ENCLOSURE TO WHICH IT IS MOUNTED

RELATED APPLICATION

This application claims priority from U.S. Provisional Application having Ser. No. 60/284,260 filed Apr. 17, 2001.

BACKGROUND OF THE INVENTION

1. Field of the Invention

The present invention is related to the construction of acoustic radiators, both active speakers and passive radiators, and more specifically acoustic radiators having a diameter that is at least as large as the enclosure opening to which the radiator mounts thus allowing the use of a smaller enclosure than the prior art for the same capacity radiator.

2. Description of the Prior Art

The sound particularly from sub-woofer speakers suffers from the speaker and driver lacking the ability to move large distances to produce reasonable sound pressure levels at lower frequencies. The lower the frequency to be reproduced, the more that limitation affects the sound from the speaker. Speaker designers have tried many ways to improve the low frequency roll off to enhance the ability of the speaker to reproduce lower frequencies. Many of the prior art techniques employed by speaker designers to increase the low frequency response of the speakers often required larger and deeper enclosures to accommodate the larger speaker configurations. When the desire to improve efficiency was a factor, the designers of prior art speakers resorted to the use of larger enclosures along with larger speaker drivers. Some prior art speakers also relied on a long excursion driver as a means of maximization of the volume of air that the particular speaker moved. Other prior art low frequency speaker designs, to provide more sound output, rely on more driver piston area or more driver excursion, or both.

All prior art speaker designs follow a conventional construction design that include a resilient suspension diaphragm (i.e., surround) that encircles and connects to the outer diameter of a rigid speaker cone that is driven at the center by the driver (i.e., voice coil). In this construction configuration, the outer circumference of the surround attaches to the speaker frame (i.e., basket) and extends inward from the circumference of the basket resulting in the speaker cone having a diameter that is significantly less than the outer diameter of the basket. Thus the area of the speaker cone is always smaller than the are of the mouth of the speaker basket by about 20 to 30% in area profile. Additionally, the speaker cone of the prior art speakers is moved from a rest position inward and outward, thus the speaker cone on the inward strokes moves into the enclosure and displaces some of the enclosure air volume.

Conventional speakers are constructed as illustrated in the simplified cross-sectional diagram of FIG. 1. The conventional speaker design includes a speaker enclosure 2 with the outer diameter flange of speaker basket 4 attached to the mouth of enclosure 2. Below, and mounted to the bottom of basket 4, is permanent magnet 6 with voice coil 8 free to ride up and down the center magnetic poles, through a central hole defined by the bottom of basket 4 in response to electrical signals applied to the coils of voice coil 8 by an amplifier (not shown). The center of cone 12 is attached to the portion of voice coil 8 that extends above frame 4 and the outer diameter of cone 12 that extends toward the open mouth of enclosure 2 has affixed thereto an inner flange 18 of surround 14. Surround 14, as shown in FIG. 1, has a semi-circular cross-section, half donut shape, that extends outward from the mouth of enclosure 2, and has a second flange 16 extending outward from the half donut shape of surround 14 which is attached to outer flange of basket 4 and mouth of enclosure 2. Additionally, the conventional speaker includes a flexible spider 10, and is shown here having an optional inner cone face 12'.

Typically, the surround is made from a half circle, half donut shaped elastic material (e.g., rubber, foam, polyester, or cloth). The maximum sound pressure level from a speaker is directly proportional to the volume of air moved, with the volume of air moved being equal to the area of the cone times the excursion, or the stroke, of the voice coil. As shown in FIG. 1 for a conventional speaker, the surround suspension extends toward the center of the enclosure mouth resulting in the speaker cone being significantly smaller than the mouth of the enclosure thus compromising the piston area, or the working area, of the speaker. It can thus be seen that the longer the stroke of the voice coil, the wider (i.e., larger half circle diameter) the surround must be which even further compromises the working area of the speaker.

FIG. 2 illustrates the flexing of surround 14 as cone 12 is driven. Cone 12 is shown in two different positions, $\mathbf{12}_a$ being the relaxed position, and $\mathbf{12}_b$ being the maximum outward driven position with the distance between those positions being $X_{max}$. Also shown is a designation of the cone diameter, $C_d$, which is discussed further below. Three profiles of surround 14 are also shown with $\mathbf{14}_a$ being the profile with cone 12 in the relaxed position, and $\mathbf{14}_b$ corresponding to cone in the maximum outward driven position. From FIG. 2 it can be seen that in the maximum outward driven position, the profile of surround $\mathbf{14}_b$ is nearly a straight line. In the relaxed profile, surround *14a* is a half circle, then the length of the outside surface of surround 14 is $(\pi D)/2$, where D is the diameter of the surround profile. To tie the size of the surround to the maximum stroke of the speaker, an approximation can be made by considering the profile of the surround in the maximum stoke position to be a straight line and the relationship of the diameter D to $X_{max}$ can be seen from the triangular relationship between the measurements in the lower left of FIG. 2. Using that triangular geometry it can be seen that:

$$((\pi D)/2)^2 = D^2 + X_{max}^2$$

and solving that equation yields the following:

$$2.47D^2 - D^2 = X_{max}^2, \text{ or } 1.47D^2 = X_{max}^2$$

This relationship Is a good approximation of the geometrical relationship between the surround diameter and the maximum excursion of the speaker. Speaker designers typically increase the computed diameter based on a certain maximum excursion by 15%.

Therefore, for a speaker having a maximum excursion of 1 inch each way, using the above calculated result yields:

$1.47D^2=1^2$; or $1.47D^2=1$; $D=(1/1.47)^{1/2}=0.824$ inches for a maximum excursion of ±1 inch from rest for the cone. Now, by adding the recommended 15% to the resultant value for D, i.e., $1.15D=1.15\times0.824=0.947$ inches, or about one inch. Note, that for the 1 inch example above, the diameter of the cone, $C_d$ will be approximately 2 inches less than the diameter of the mouth of the enclosure. It is not believed that speaker designers knew about these simple relationships; instead the prior designs have been based on the conventional wisdom in the industry, not mathematics.

Since the mathematical relationship disclosed above was not previously known, the volume of air moved by the speaker to the maximum excursion was also unknown. Again referring to FIG. 2, the volume of air moved can be seen to be represented mathematically by the following equation:

$$V=(1/6)\pi X_{max}[(3C_D^2/4)+3D^2+(6C_D D/2)+(3C_D^2/4)+X_{max}^2]$$

which reduces to $$V=(1/6)\pi X_{max}[(3C_D^2/2)+3D^2+3C_D D+X_{max}^2]$$

Using a typical 12 inch woofer, D=1.7 inches, $C_d$=7.5 inches and $X_{max}$=1.5 inches, $$\begin{aligned} V &= (1.5/6)\pi[(3(7.5)^2/2)+3(1.7)^2+3\cdot 7.5\cdot 1.7+(1.5)^2] \\ &= 0.25\cdot 3.14[1.5\cdot 56.25+3\cdot 2.89+38.25+2.25] \\ &= 0.785[84.375+8.67+38.25+2.25] \\ &= 0.785[133.545] = 104.83 \text{ cubic inches} \end{aligned}$$

It would be desirable to have a speaker or passive radiator design where the outer diameter of the speaker cone is at least the diameter of the enclosure opening to which the acoustic radiator is mounted. Such an acoustic radiator design will provide several advantages. Some of the desired advantages are: a smaller enclosure for the same capacity acoustic radiator when compared to conventional speakers; the surround will not compromise the performance of the acoustic radiator; displacement of a greater volume of air with an enclosure opening that is the same size as a conventional speaker; and many others. The present invention provides such an acoustic radiator design.

SUMMARY OF THE INVENTION

The present invention provides several different acoustic radiator designs that improve acoustic radiator performance over the prior art while providing a larger baffle (i.e., cone), with a lesser volume of air displaced than by the smaller prior art speaker design, while maintaining the same diameter of the enclosure mouth and at the same time allowing the use of a shallower enclosure. These advantageous are achieved in a variety of ways with several configurations.

One configuration provides a vertically oriented resilient mount for a speaker or passive radiator baffle (cone) where that resilient mount is entirely beneath the outer edge of the baffle (cone), between the outer rim of the baffle (cone) and the outer flange of the basket. In another configuration, the resilient mount resembles a prior art surround that has been rotated outward by 45° to 70° thus extending the mouth of the baffle (cone) outward from the mouth of the enclosure thus allowing the use of a larger diameter baffle (cone). In yet another configuration, the surround mounts to the outer flange of the basket beneath the dome of the surround. In so doing the surround is move outward from the center of the enclosure also allowing the incorporation of a larger diameter baffle (cone) in an enclosure with the same diameter mouth.

DESCRIPTION OF THE EMBODIMENTS OF THE PRESENT INVENTION

Note, that in each of the figures included here, what is shown is a simplified cross-section of a speaker as if a slice was taken from the center with both the closest and farthest portions of the speaker removed. In actual design, each speaker is circular, oval or another shape, with the mouth of the basket, the baffle (cone) and the resilient mount being correspondingly shaped. The outer edge of the speaker baffle (cone) is attached to the circular upper flange of the resilient mount, and the lower flange of the resilient mount is attached to the correspondingly shaped mouth of the basket. The speaker in each of the figures includes a ring shaped magnet attached to the bottom of the basket with the magnet having top and bottom surfaces and a hole therethrough between the top and bottom surfaces. In addition, magnetic field extenders are included on the top and bottom surfaces of the magnet with a portion of the bottom field extender extending upward into the hole. The field extenders are necessary to turn the magnetic fields of the magnet toward the center hole. Also, there is a voice coil that includes a thin walled, non-metallic tube with a center hole therethrough along the major axis with a coil wound near one end. The other end of the tube is affixed to the baffle (cone) with the other end of the voice coil placed over the upward extending portion of the bottom field extender with the voice coil being free to move up and down relative to the top and bottom surfaces of the magnet when an audio electrical signal is applied to the Coil to move the baffle in response to the audio signal. The two ends of the coil are attached to insulated connectors on the side of the basket (not shown) to facilitate the application of audio signal to the voice coil.

It is to be understood when viewing each figure that the same design can be used with a passive radiator not having need of the magnet and voice coil. Thus, each embodiment of the present invention applies to all acoustic radiators.

Figure 1:
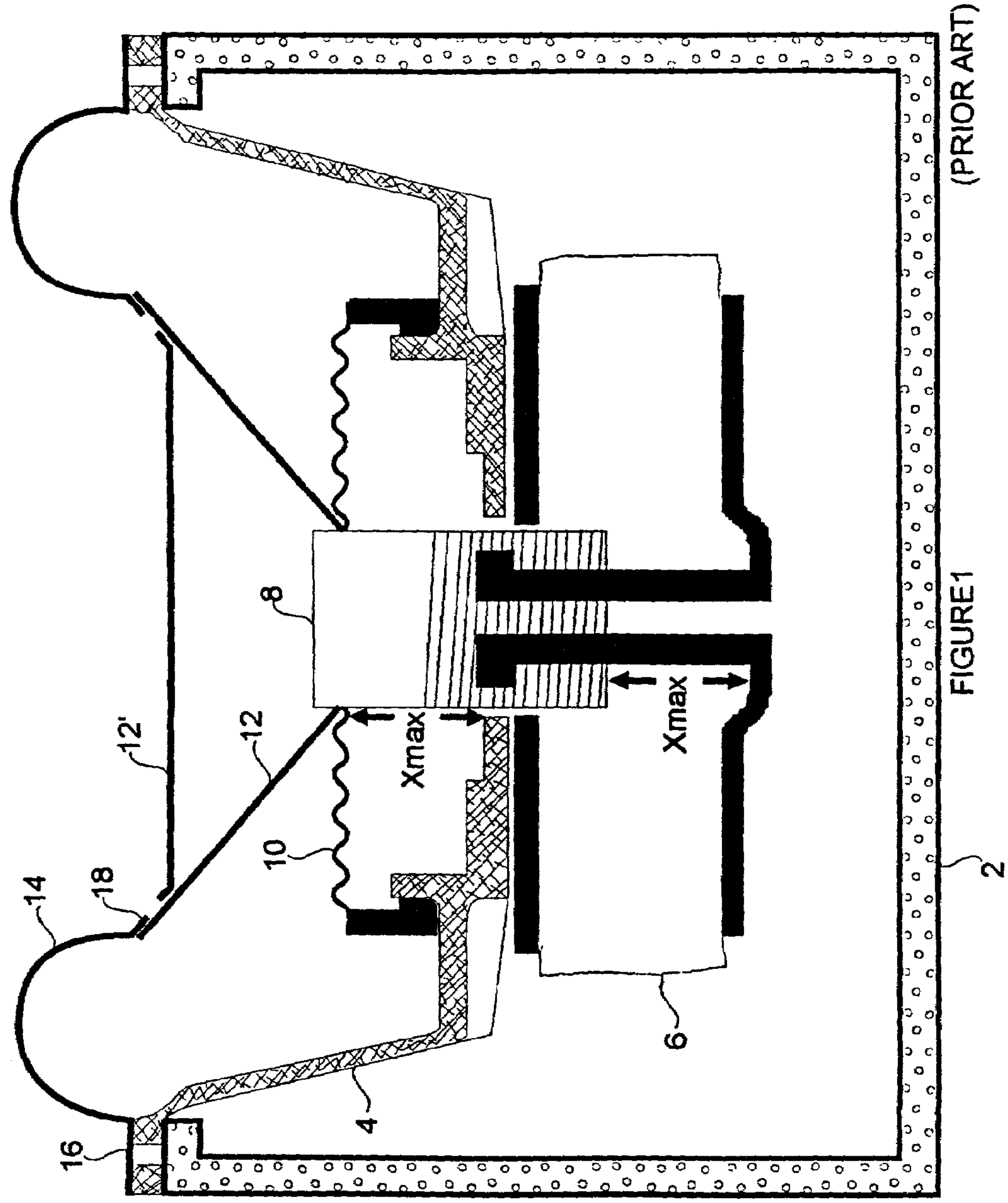
FIGURE1 (PRIOR ART)
FIG. 1 is a simplified cross-sectional representation of a prior art speaker.
Figure 2:
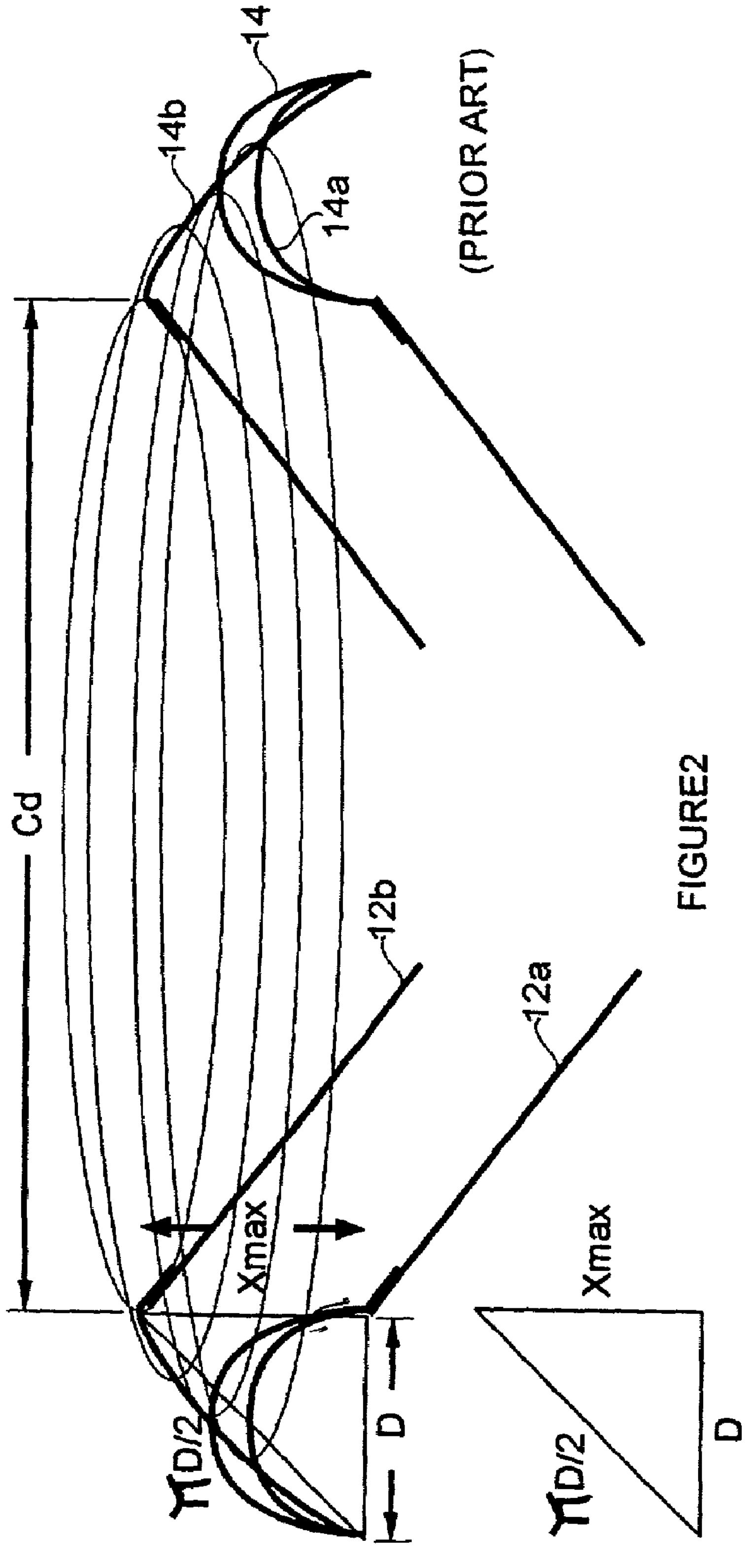
FIGURE2 (PRIOR ART)
FIG. 2 is a simplified profile of a prior art speaker with the cone and surround in relaxed and maximum extended positions to illustrate the relationship between the necessary size of the surround relative to the maximum travel of the cone.
Figure 3:
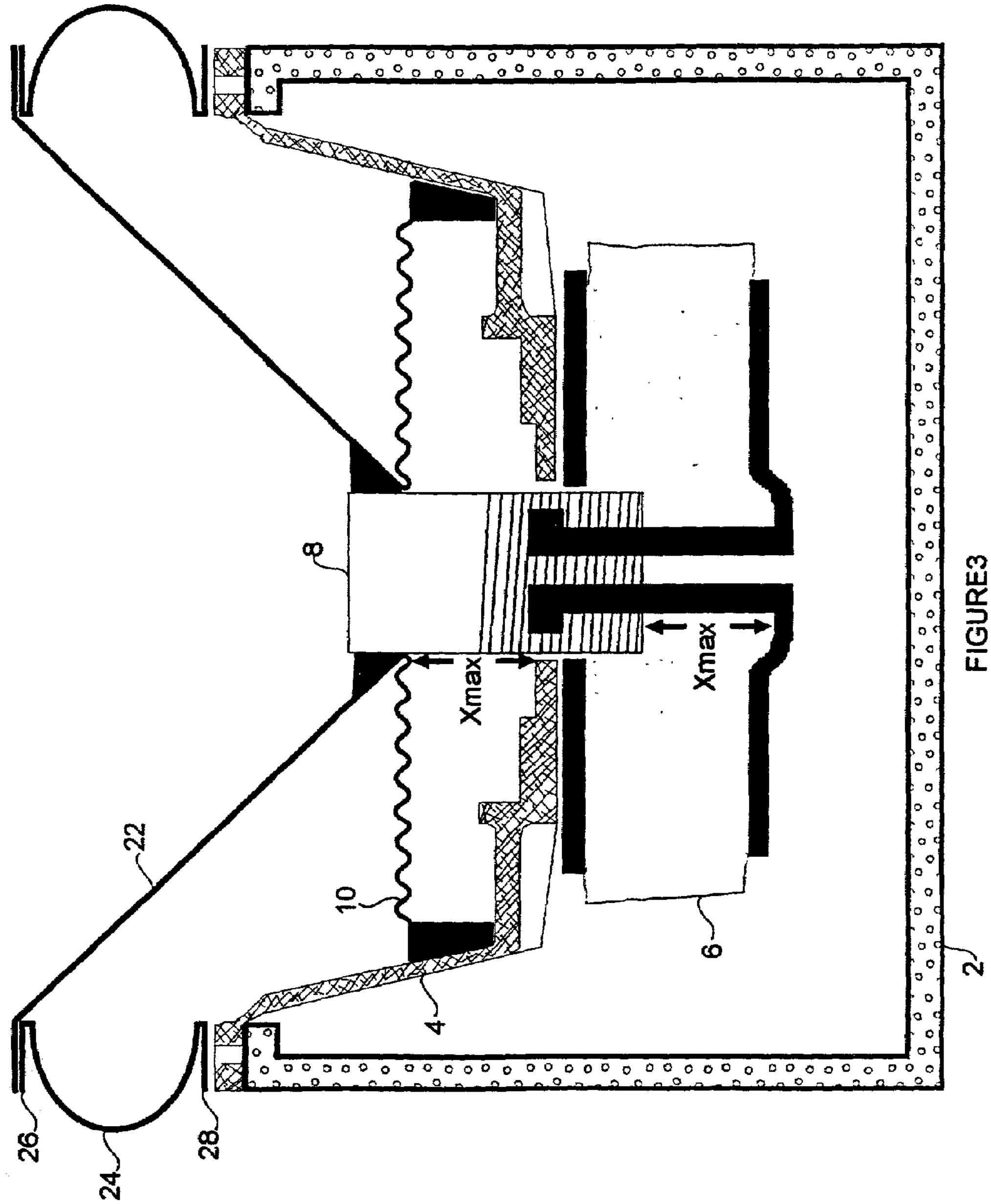
FIG. 3 is a simplified cross-sectional representation of a first embodiment of the present invention with a convex outward configured vertical resilient mount for the acoustic radiator baffle (cone)

A first embodiment of the acoustic radiator design of the present invention is illustrated in FIG. 3 as a simplified cross-sectional representation of a speaker. The component parts of this speaker that are located within a speaker enclosure 2, are basket 4, permanent magnet 6, voice coil 8 and spider 10 which are substantially the same as the corresponding elements of the prior art speaker discussed above. The most significant differences between this speaker design and the design of the prior art speakers is the size of speaker baffle (cone) 22 relative to the mouth of enclosure 2, the outer diameter of speaker baffle (cone) 22 extends outside of speaker enclosure 2, and the resilient mount 24 is vertically between the outer edge of speaker baffle (cone) 22 and the outer diameter flange of basket 4. From FIG. 3 it can be seen that resilient mount 24, unlike surround 14 in FIGS. 1 and 2, extends vertically upward from the flange of basket 4, instead of horizontally inward as does surround 14 in the prior art speakers. The resilient mount 24 in FIG. 3 has a vertical half round profile that rings the outer flange of basket 4 with a convex surface presented to the outside of the speaker enclosure 2 (i.e., like a donut that has been sliced vertically parallel to the central axis of the donut with the inside half of the donut removed). Resilient mount 24 also includes a lower flange 28 that attaches to the flange of basket 4 and the mouth of enclosure 2, as well as an upper flange 26 that is shown attached to the under side of the outer diameter of speaker baffle (cone) 22. It should be noted that with this design, the outer diameter of speaker baffle (cone) 22 is at least as large as the diameter of the mouth of enclosure 2.

Thus, in motion, the forces on resilient mount 24 are along the same axis when the speaker baffle (cone) is extended outward or retracted inward. From FIG. 3 it can be seen that the compression and stretching forces on resilient mount 24 are always perpendicular to both the edge of speaker baffle (cone) 22 and the outer flange of basket 4. In this configuration resilient mount 24 provides the same resistance in both directions of travel of speaker baffle (cone) 22. As noted above, this design is also applicable to a passive radiator without magnet 6 and voice coil 8.

Figure 4:
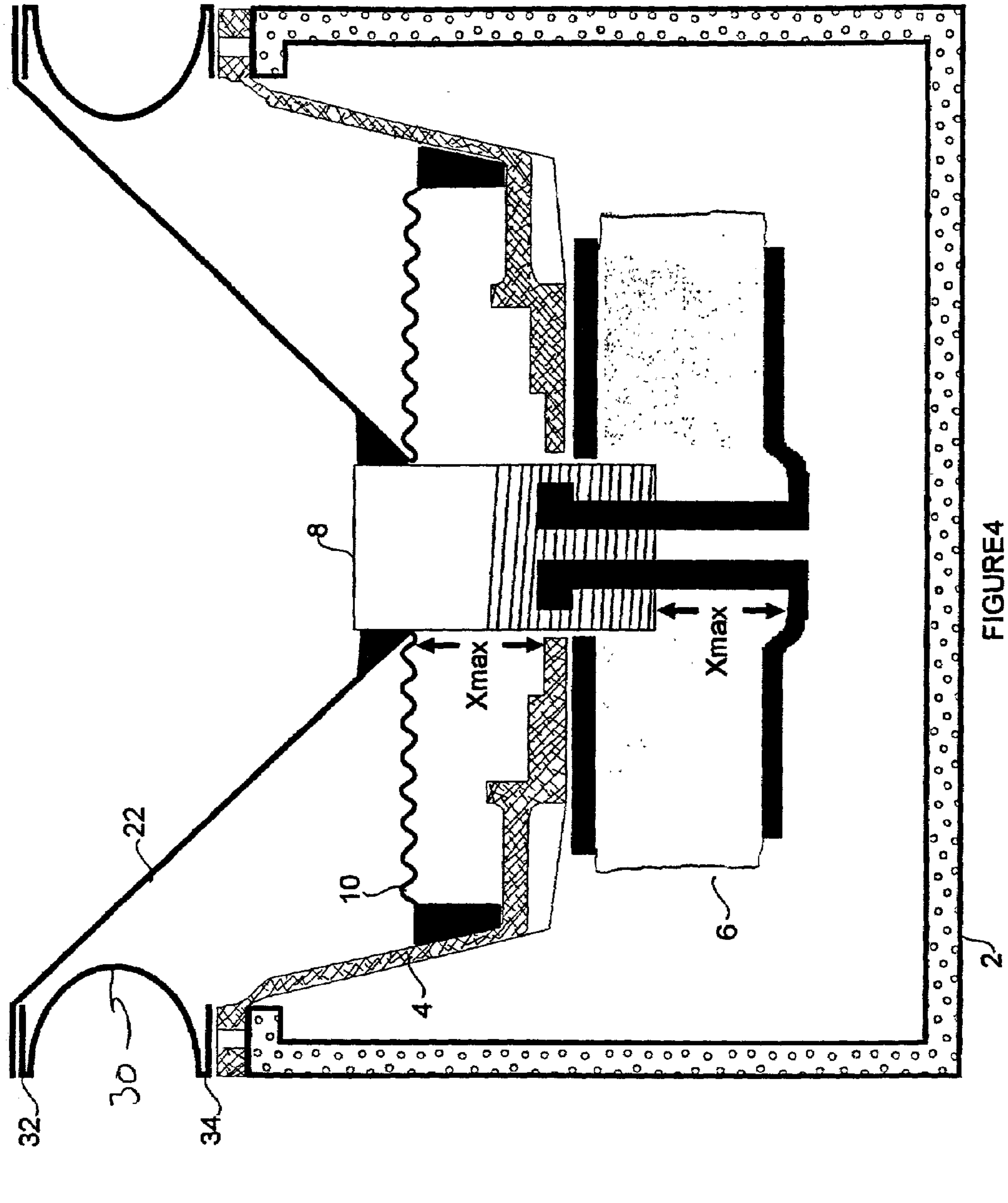
FIG. 4 is a simplified cross-sectional representation of a second embodiment of the present invention with a concave outward configured vertical resilient mount for the baffle (cone)

The embodiment of FIG. 4 is similar to that of FIG. 3 with the difference being in the shape of the resilient mount 30. Here resilient mount 30 also extends vertically upward from the flange of basket 4, instead of horizontally inward as is surround 14 in the prior art speakers. The resilient mount 30 in FIG. 4 has a vertical half round profile that rings the outer flange of basket 4 with a concave surface presented to the outside of the speaker enclosure 2 (i.e., like a donut that has been sliced vertically parallel to the central axis of the donut with the outside half of the donut removed). Resilient mount 30 also includes a lower flange 34 that attaches to the flange of basket 4 and the mouth of enclosure 2, as well as an upper flange 32 to which the outer diameter of speaker baffle (cone) 22 is attached. It should be noted that with this design, the outer diameter of speaker baffle (cone) 22 is also at least as large as the diameter of the mouth of enclosure 2 and extends outward from the mouth of enclosure 2. The direction of the forces on resilient mount 30 as speaker baffle (cone) 22 moves inward and outward, thus the performance of resilient mount 30 is the same as discussed above for resilient mount 24 of FIG. 3. This embodiment also applies to a passive radiator.

Figure 5:
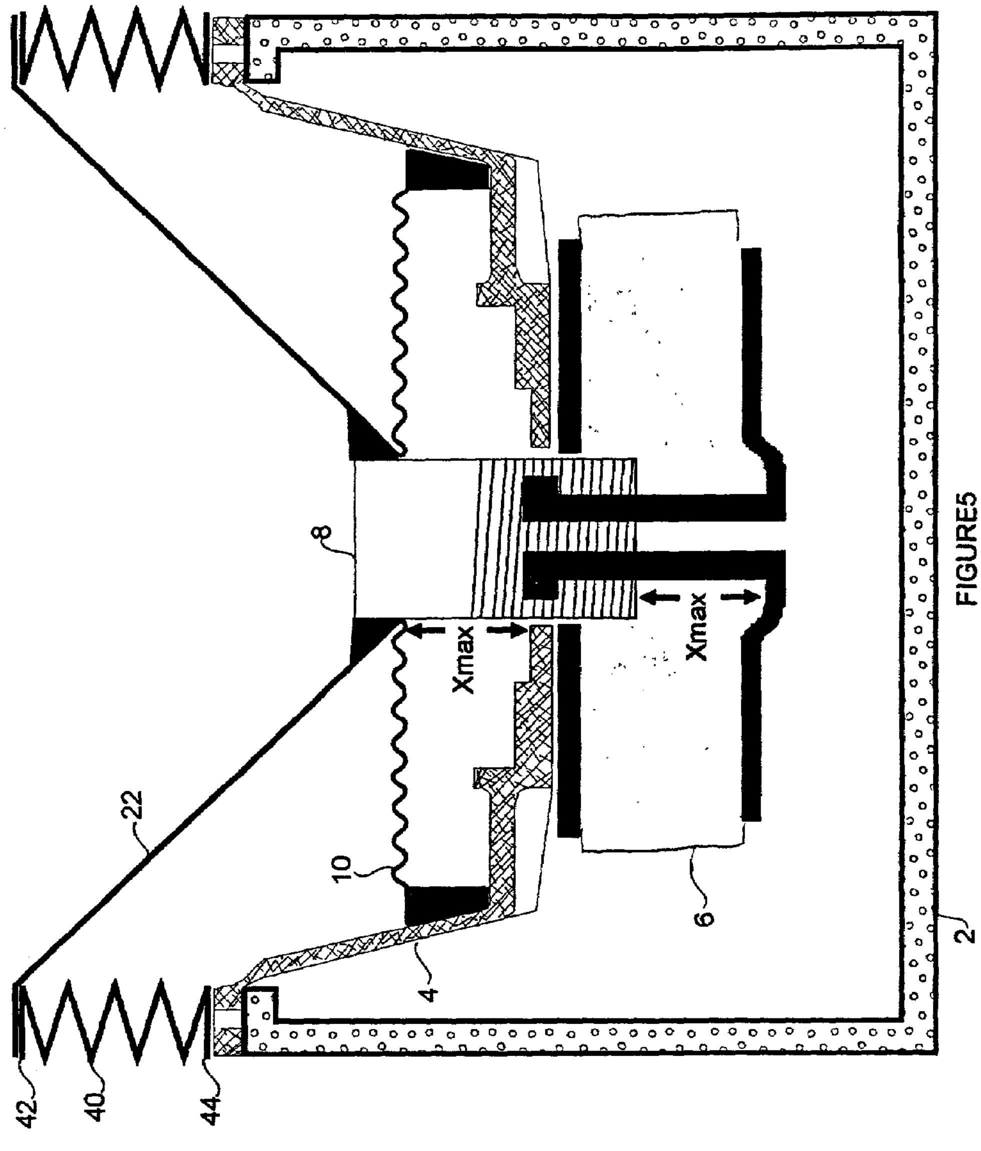
FIG. 5 is a simplified cross-sectional representation of a third embodiment of the present invention with a accordion folded vertical resilient mount.

FIG. 5 illustrates yet another embodiment of the present invention that is similar to the other two with yet a third configuration for the resilient mount. Here also the difference between the design of FIG. 3, and also FIG. 4, is only in the shape of resilient mount 40. Here resilient mount 40 also extends vertically upward from the flange of basket 4, instead of horizontally inward as is surround 14 in the prior art speakers. Resilient mount 40 is accordion pleated with a lower flange 44 that attaches to the flange of basket 4 and the mouth of enclosure 2, as well as an upper flange 42 to which the outer diameter of speaker baffle (cone) 22 is attached. It should be noted that with this design, the outer diameter of speaker baffle (cone) 22 is also at least as large as the diameter of the mouth of enclosure 2 and extends outward from the mouth of enclosure 2, and as with resilient mounts 24 and 30, the performance is the same as speaker baffle (cone) 22 moves inward and outward. This embodiment is also compatible with a passive radiator.

Figure 6:
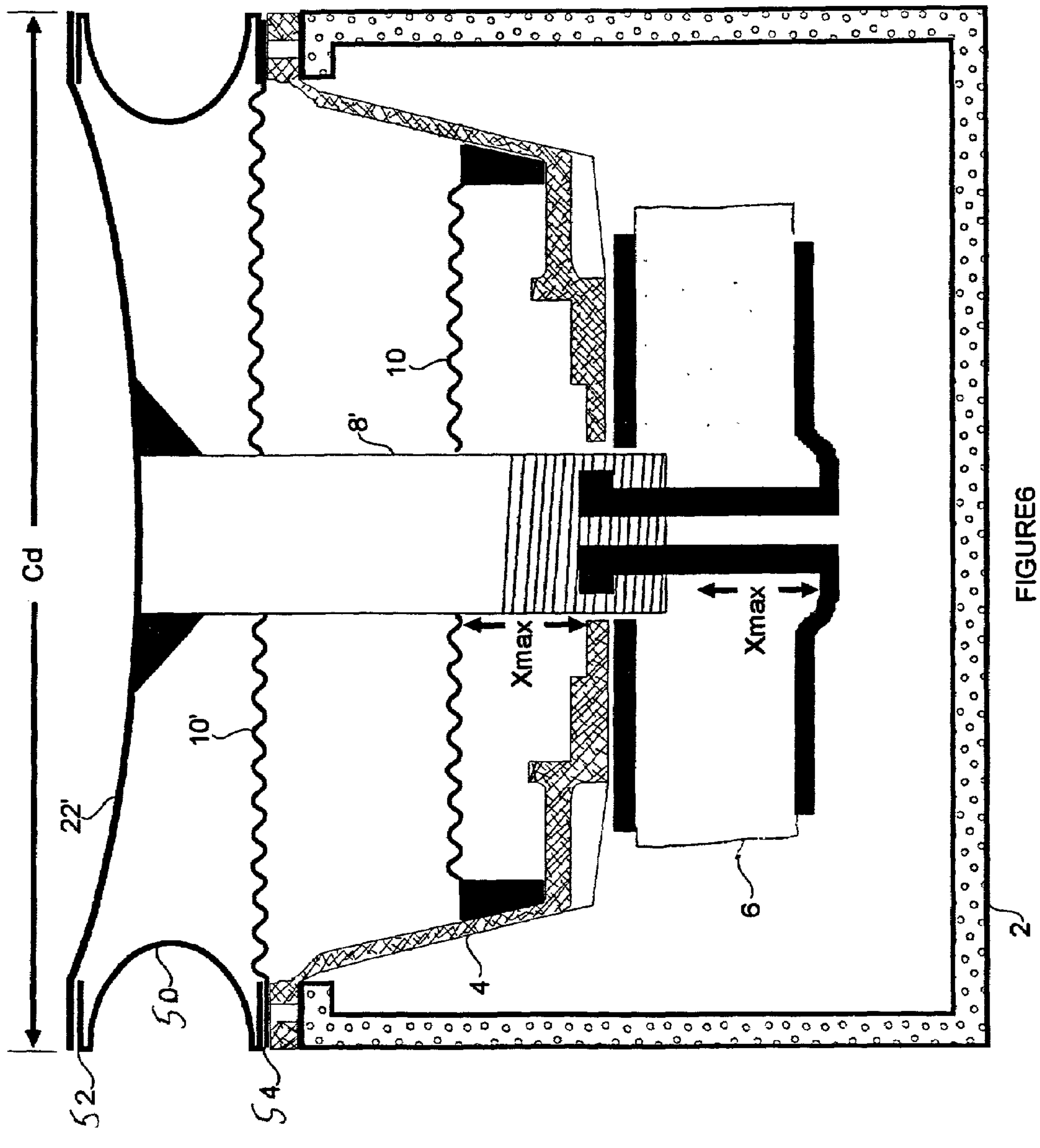
FIG. 6 is a simplified cross-sectional representation of a long piston, shallow baffle (cone) variation of the present invention that can be used with each of the vertical resilient mount embodiments.

FIG. 6, includes resilient mount 50 that is similar to resilient mount 30 of FIG. 4, and can employ any vertically mounted resilient mount of any of FIGS. 3, 4 or 5, or any variation of any of them. FIG. 6 is primarily included here to illustrate a long piston, shallow baffle (cone) (e.g., saucer shaped) embodiment of the present invention. There are three differences here from the specific embodiment shown in FIG. 4, namely the longer voice coil piston 8', the nearly flat speaker baffle (cone) 22' and the inclusion of a second spider 10' to stabilize the longer voice coil piston 8' in the center of the speaker. The second spider 10' being introduced to maintain the direction of push and pull of piston 8' substantially perpendicular to the center of speaker baffle (cone) 22' to minimize any distortion that may result if piston 8' were at an angle that is not substantially perpendicular to magnet 6. There could be other spider arrangements than that shown here, one or the other of spiders 10 and 10', a single spider perhaps half way between the location of spiders 10 and 10' could be used with smaller speakers, and with even larger speakers, more than two spiders might be advantageous. The actual number and placement of the spiders is a matter of design choice and is not considered to be a limitation of any of the various embodiments of the present invention. The remainder of the speaker configuration is the same as that of FIG. 5 with a similar result if resilient mount 40 (or whatever resilient mount configuration might be employed, is located further outward, namely an active speaker baffle (cone) that has a larger diameter than the mouth of the speaker enclosure. This embodiment can also be used in a passive radiator as discussed above.

The materials for use for each of the component parts of the various embodiments of the speakers of the present invention are the same as those used in the prior art speakers. Specifically the materials that can be employed for the resilient mount of the present invention is the same as those for the surround of the prior art speakers, namely a material that is flexible and creates little retarding force on the movement of the speaker baffle (cone). The speaker or passive radiator baffle (cone) of the present invention, like that of the prior art speakers, is made of a material that is stiff in comparison to the resilient mount.

Given that the resilient mount is below the outer edge of the speaker or passive radiator baffle (cone), instead of beside the outer edge of the baffle (cone) as in the prior art speakers, the calculation for the volume of air displaced by the acoustic radiators of the present invention in either direction of travel of the baffle (into or out of the basket) can be expressed by a much simpler equation, namely:

$$V=(\text{Area of outer dimensions of the baffle})\cdot X_{max}$$

where $X_{max}$ is the maximum travel distance of the baffle in either direction from the rest position.

For a baffle having a circular outer edge, the volume of air displaced in either direction is calculated as follows:

$$V=\pi\cdot R^2\cdot X_{max}=\pi\cdot(C_d/2)^2\cdot X_{max}$$

where R is the radius of the outer edge of the baffle, and $C_d$ is the diameter of the baffle.

Thus, a 12 inch woofer of the design of FIG. 6 with a maximum travel of ±1.5 inches has a baffle (cone) diameter, $C_d$=12 inches, and since the resilient mount is below the outer edge of the baffle (cone), D=0, thus there is no D term in the equation above. Therefore the maximum volume of air displaced in either direction by 12 inch woofer using the design of FIG. 6 of the present invention is:

$$V=\pi\cdot 1.5\cdot(12/2)^2=4.71\cdot 36=169.56 \text{ cubic inches.}$$

Thus, the volume of air displaced by the larger baffle (cone) of the present invention is less than ⅓ (109.56: 358.354, or 0.306:1) that of the prior art speaker. Since a speaker enclosure must contain a volume of air equal to a multiple of the maximum volume of air displaced by the baffle as it moves into the basket, thus using the same multiple for prior art speakers and those of the present invention, speakers of the present invention allow the use of an enclosure with a must smaller overall interior size. In the example of the 12 inch woofer, the interior volume of the enclosure for a 12 inch woofer of the present invention can be more than ⅔ smaller than the enclosure for a 12 inch woofer of the prior art.

Thus it can be seen that the acoustic radiators of the present invention maximize the area and the stroke of radiator of the present invention by placing the resilient mount below the outer edge of the rigid diaphragm of the baffle (cone). Additionally, it has been shown that acoustic radiators of the present invention need an enclosure having a reduced volume as compared to the enclosure volume required by prior art speakers during inward strokes of the speaker baffle (cone). Acoustic radiators of the present invention also offer a symmetrical resistance for inward baffle (cone) strokes versus outward baffle (cone) strokes since the resilient mount of the present invention is between the outer edge of the baffle (cone) and the outer edge of frame 4. Mounted in this way the forces on the resilient mount are perpendicular to the upper and lower ends in both directions resulting in the stretching and compression forces being substantially the same. In the prior art, the air displacement volumes are imbalanced since the angle of exertion on the surround is not the same on the inward stroke versus the outward stroke resulting in the surround providing more resistance on the inward stroke than the outward stroke. Lastly, but certainly not least, the present invention offers huge radiator baffle (cone) excursions versus those of prior art speakers without a reduction of baffle (cone) area since the resilient mount suspension in the present invention is located vertically below the outer edge of the baffle (cone), as opposed to horizontally surrounding the speaker baffle (cone) that reduces the size of the speaker baffle (cone) as in the prior art.

Figure 7:
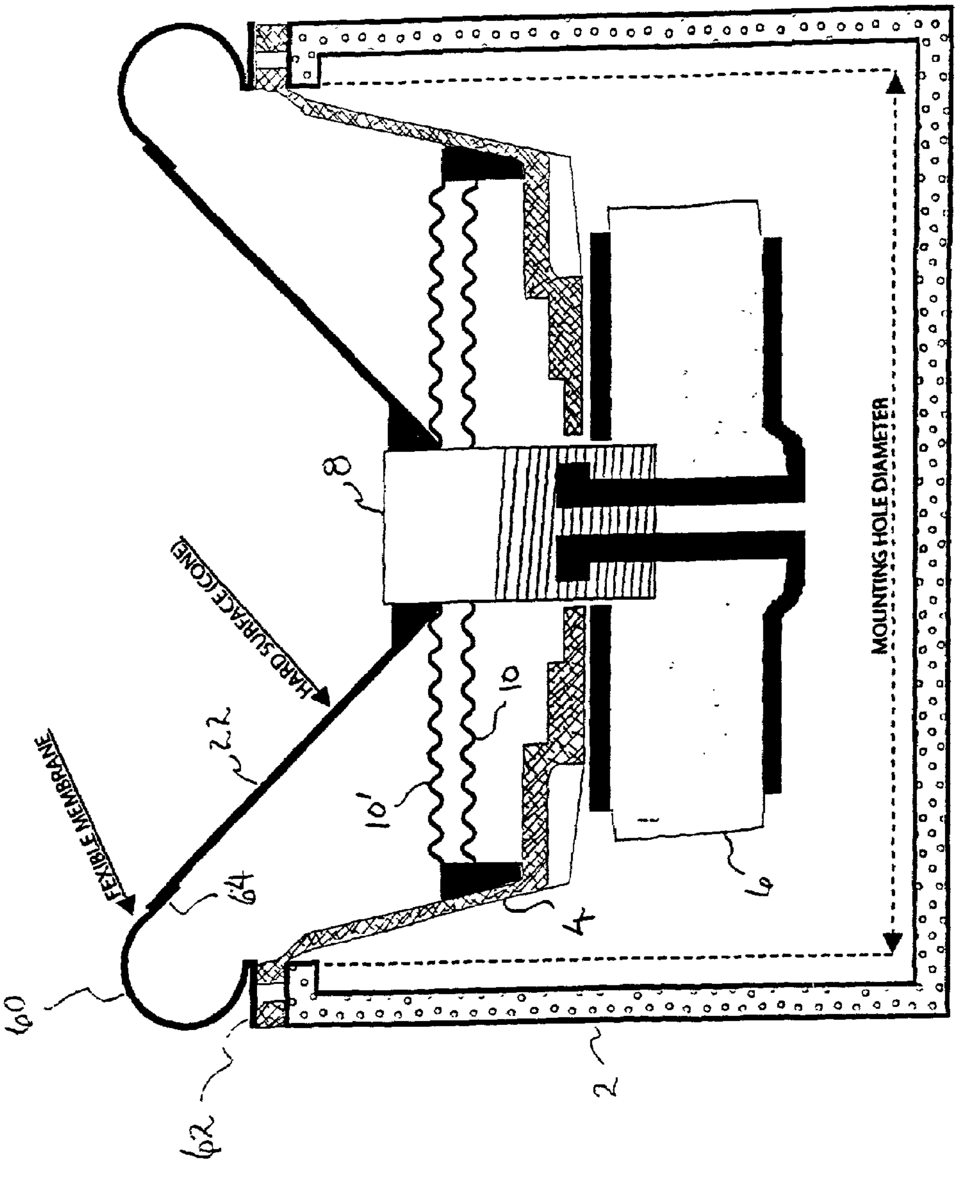
FIG. 7 is a simplified cross-sectional representation of a fourth embodiment of the present invention having a resilient mount that is mid-way between the conventional surround of the prior art and the second embodiment of the present invention of FIG. 3.

FIG. 7 is a simplified cross-sectional representation of a fourth embodiment of the present invention having a resilient mount 60 that is oriented mid-way between the conventional surround 14 of the prior art and the resilient mount 24 of the first embodiment of the present invention shown in FIG. 3 (the end of the surround not coupled to the top of the basket being less than 70° from vertical relative to the top of the basket toward the center of the basket). Resilient mount 60, like the other resilient mounts of the present invention, is entirely outside enclosure 2, as is the outer diameter of baffle (cone) 22. This configuration also permits the use of an enclosure 2 with a smaller volume than the prior art while providing the same, or greater travel for baffle (cone) 22. This embodiment is also compatible with a passive radiator.

Figure 8:
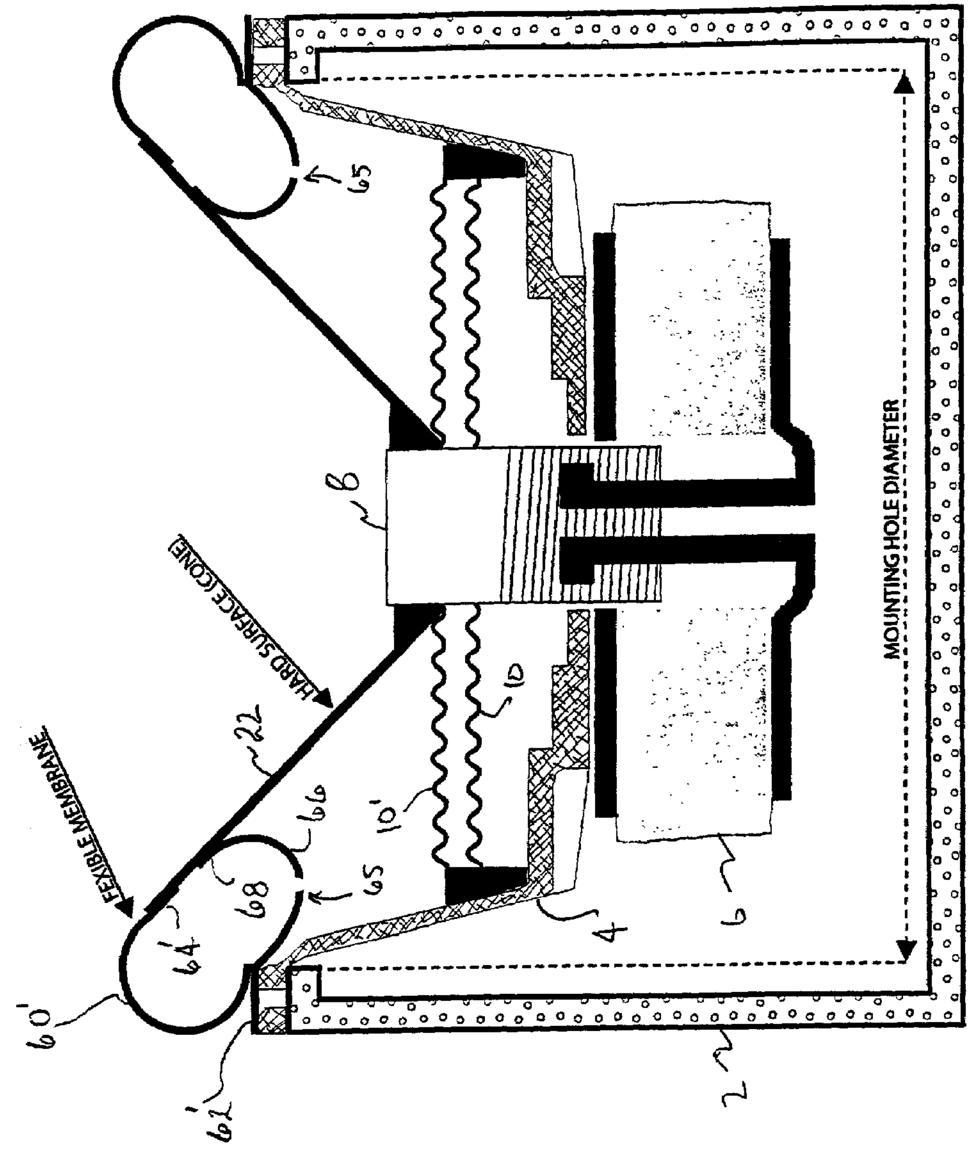
FIG. 8 is a simplified cross-sectional representation of a fifth embodiment of the present invention having a resilient mount that is similar to that of FIG. 7 with an added inner semicircular portion.

The fifth embodiment of FIG. 8 is similar to the embodiment of FIG. 7 with resilient mount 60' also including an added inner semicircular portion 66 giving the combined surround an elliptical cross-section at rest; similar to a pinched bicycle tube between the outer edge of baffle (cone) 22 and the outer flange of basket 4, with an added tab 62' for mounting on the outer flange of basket 4. This embodiment has all of the advantages of that of FIG. 7, while offering the same amount of resistance to the movement of baffle (cone) 22 in both directions. To optimize the equal resistance result it may be necessary to provide equally spaced small holes 65 in inner semicircular portion 66 around the plane of the mouth of basket 4. This embodiment is also compatible with passive radiators.

Figure 9:
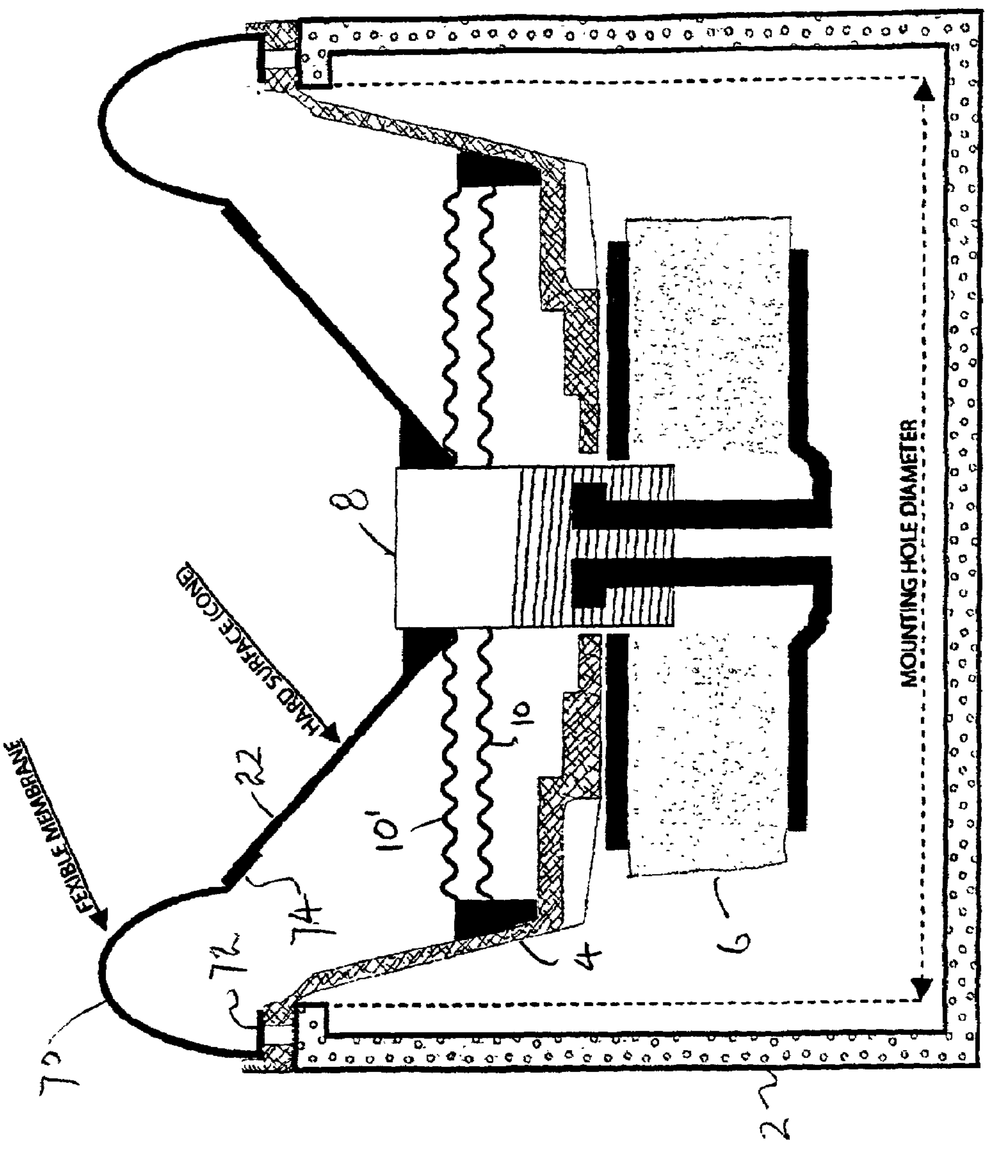
FIG. 9 is a simplified cross-sectional representation of a sixth embodiment of the present invention having a surround with an elliptical cross-section with a substantial portion of the surround mounted directly above the surrounding edge of the speaker opening.

FIG. 9 is a simplified cross-sectional representation of a sixth embodiment of the present invention. This embodiment provides an improvement to the more traditional surround of the prior art. By comparison of surround 70 of FIG. 9 with surround 14 of FIG. 1 if can be seen that surround 70 of the present invention has an elliptical cross-section, while surround 14 of the prior art has a semicircular cross-section. Additionally, and most important, surround 70 of the present invention mounts with the outer flange of basket 4 under the dome of surround 70, as opposed to tab 16 of the prior art that extends to the outside of surround 14 with surround 14 entirely over the mouth of the enclosure. By orienting tab 72 inward and under the dome of surround 70, surround 70 moves further away from the center of enclosure 2 thus allowing the use of a larger speaker baffle (cone) 22 with the same mouth opening of enclosure 2 without extending beyond the sides of enclosure 2. Further, from FIG. 9 it can be seen that in the illustrated example, approximately 25-30% of surround 70 extends over the outer flange of basket 4. Depending on the size and maximum travel of the speaker, more of surround 70 could be reoriented over the outer flange of basket 4. This embodiment is also compatible with passive radiators.

While several specific embodiments have been included here to illustrate the present invention, the present invention is not limited to only these embodiments. The present invention is intended to be used in all types and sizes of acoustic radiators both active and passive, all frequency ranges, and all depths (deep, mid-depth and shallow) and also includes equivalents of each of them that produce the same advantageous results as illustrated here with the embodiments shown and discussed.

What is claimed is:

1. An acoustic radiator comprising:

a basket having a bottom and sides extending away from the bottom with the upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other;

a flexible surround having a preshaped portion between a first edge and a second edge, said first edge coupled to the upper edge of the basket with said second edge outside the mouth of the basket, in vertical alignment with the first edge of the surround and the upper edge of the sides of the basket; and a baffle defining an outer edge coupled to the second edge of the flexible surround with the outer edge of the baffle having third dimensions.

2. The acoustic radiator of claim 1 wherein the baffle is rigid compared to the flexible surround.

3. The acoustic radiator of claim 1 wherein the surround provides equal resistance to movement of the baffle toward and away from the bottom of the basket.

4. The acoustic radiator of claim 1 wherein the third dimensions of the outer edge of the baffle are at least as large as the second dimensions of the mouth of the basket.

5. The acoustic radiator of claim 1 wherein said surround has a vertical half round profile between the first and second edges with a convex surface presented outward between the mouth of the basket and the outer edge of the baffle.

6. The acoustic radiator of claim 1 wherein said surround has a vertical half round profile between the first and second edges with a convex surface presented inward between the mouth of the basket and the outer edge of the baffle.

7. The acoustic radiator of claim 1 wherein said surround is accordion pleated between the first and second edges with a similar surface presented inwardly and outwardly between the mouth of the basket and the outer edge of the baffle.

8. The acoustic radiator of claim 1 wherein the baffle is cone shaped with the cone extending toward the bottom of the basket.

9. The acoustic radiator of claim 1 wherein the baffle has a flat inner and outer surface.

10. The acoustic radiator of claim 1 wherein the baffle has a shallow saucer shape with a bottom of the saucer extending toward the bottom of the basket.

11. The acoustic radiator of claim 1 is a passive radiator.

12. The acoustic radiator of claim 1 wherein the volume of air displaced by the baffle in either direction of travel, into or out of the basket, can be expressed by the following equation:

$$V=(\text{Area of the third dimensions})\cdot X_{max}$$

where $X_{max}$ is the maximum travel distance of the baffle in either direction from the rest position.

13. The acoustic radiator of claim 12 wherein the volume of air displaced for a baffle with a circular outer edge, the equation is:

$$V=\pi\cdot R^2\cdot X_{max}=\pi\cdot(C_d/2)^2\cdot X_{max}$$

where R is the radius of the outer edge of the baffle, and $C_d$ is the diameter.

14. The acoustic radiator of claim 1 further includes:

a ring shaped magnet attached to the bottom of the basket, the magnet having a top and a bottom surface and a hole defined therethrough between the top and bottom surfaces;

magnetic field extenders on the top and bottom surfaces of the magnet with a portion of the bottom field extender extending upward into the hole;

a voice coil including a thin walled, tube of a non-magnetic material defining a central hole therethrough along a major axis of the tube, the tube also having a first end and a second end, the first end affixed to the baffle and an electrically conductive wire coil wound on the cylinder near the second end, the second end of the tube being passed over the upward extending portion of the bottom field extender with the tube being free to move up and down relative to the top and bottom surfaces of the magnet when an electrical signal is applied to the coil causing the baffle to move in response to the electrical signal.

15. An acoustic radiator comprising:

a basket having a bottom and sides extending away from the bottom with the upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other;

a flexible surround having a preshaped portion between a first edge and a second edge, said first edge coupled to the upper edge of the basket with the second edge of the surround outside the mouth of the basket and is less than 70° from vertical relative to the second plane; and a baffle defining an outer edge coupled to the second edge of the flexible surround with the outer edge of the baffle having third dimensions.

16. The acoustic radiator of claim 15 wherein the surround has a half round profile between the first and second edges with a convex surface presented outward between the mouth of the basket and the outer edge of the baffle.

17. The acoustic radiator of claim 15 wherein the surround includes an inner portion and an outer portion each having first and second edges, each of said first edges of each of the inner and outer portions coupled to the the upper edge of the sides of the basket and each of said second edges of the inner and outer portions coupled to the outer edge of the baffle with the inner and outer portions otherwise being spaced apart from each other.

18. The acoustic radiator of claim 17 wherein each of the inner and outer portions of the surround has a half round profile between the first and second edges with the outer portion presenting a convex surface outward between the upper edge of the sides of the basket and the outer edge of the baffle and the inner portion presenting a convex surface inward between the upper edge of the sides of the basket and the outer edge of the baffle.

19. The acoustic radiator of claim 17 wherein the inner portion of the surround defines equally spaced small holes therethrough opening toward the bottom of the basket.

20. The acoustic radiator of claim 17 wherein the inner and outer portions of the surround are coupled together to form the surround having an elliptical cross-section with a first edge opposite a second edge along a minor axis of the elliptical cross-section.

21. The acoustic radiator of claim 20 wherein the inner oriented portion of the surround defines equally spaced small holes therethrough opening toward the bottom of the basket.

22. The acoustic radiator of claim 15 wherein the baffle is rigid compared to the flexible surround.

23. The acoustic radiator of claim 15 wherein the surround provides equal resistance to movement of the baffle toward and away from the bottom of the acoustic enclosure.

24. The acoustic radiator of claim 15 wherein the baffle is cone shaped with the cone extending toward the bottom of the enclosure.

25. The acoustic radiator of claim 15 wherein the baffle has a flat inner and outer surface.

26. The acoustic radiator of claim 15 wherein the baffle has a shallow saucer shape with a bottom of the saucer extending toward the bottom of the enclosure.

27. The acoustic radiator of claim 15 is a passive radiator.

28. The acoustic radiator of claim 15 wherein the volume of air displaced by the baffle in either direction of travel, into or out of the basket, can be expressed by the following equation:

$$V = (\text{Area of the third dimensions}) \cdot X_{max}$$

where $X_{max}$ is the maximum travel distance of the baffle in either direction from the rest position.

29. The acoustic radiator of claim 28 wherein the volume of air displaced for a baffle with a circular outer edge, the equation is:

$$V = \pi \cdot R^2 \cdot X_{max} = \pi \cdot (C_d/2)^2 \cdot X_{max}$$

where R is the radius of the outer edge of the baffle, and $C_d$ is the diameter.

30. The acoustic radiator of claim 15 wherein the acoustic radiator further includes:

a ring shaped magnet attached to the bottom of the basket, the magnet having a top and a bottom surface and a hole defined therethrough between the top and bottom surfaces;

magnetic field extenders on the top and bottom surfaces of the magnet with a portion of the bottom field extender extending upward into the hole;

a voice coil including a thin walled, tube of a non-magnetic material defining a central hole therethrough along a major axis of the tube, the tube also having a first end and a second end, the first end affixed to the baffle and an electrically conductive wire coil wound on the cylinder near the second end, the second end of the tube being passed over the upward extending portion of the bottom field extender with the tube being free to move up and down relative to the top and bottom surfaces of the magnet when an electrical signal is applied to the coil causing the baffle to move in response to the electrical signal.

31. An acoustic radiator comprising;

a basket having a bottom and sides extending away from the bottom with the upper edge of the sides forming an open mouth, the bottom in a first plane and the mouth in a second plane, said first plane and second plane spaced apart from, and substantially parallel to, each other;

a flexible surround having a preshaped portion between a first edge and a second edge, said first edge including a mounting tab that extends beneath the preshaped portion with the mounting tab coupled to the upper edge of the basket with said second edge spaced away from the first edge and extending radially toward the center of the mouth of the basket, the preshaped portion extending outward from the second plane; and a baffle defining an outer edge coupled to the second edge of the flexible surround.

32. An acoustic wave production system comprising:

an acoustic enclosure having a top, sides and a bottom with the distance between the top and bottom providing a preselected depth to the enclosure and the top defining an opening therethrough with first dimensions in a first plane; and an acoustic radiator including:

a basket having a bottom and sides extending away from the bottom with the upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other;

a flexible surround having a preshaped portion between a first edge and a second edge, said first edge coupled to the upper edge of the basket with the second edge of the surround outside the mouth of the basket and is less than 70° from vertical relative to the second plane; and a baffle defining an outer edge coupled to the second edge of the flexible surround with the outer edge of the baffle having third dimensions.

33. The acoustic radiator of claim 31 wherein the baffle is rigid compared to the flexible surround.

34. The acoustic radiator of claim 31 wherein the surround provides equal resistance to movement of the baffle toward and away from the bottom of the basket.

35. The acoustic radiator of claim 31 wherein the baffle is cone shaped with the cone extending toward the bottom of the basket.

36. The acoustic radiator of claim 31 wherein the baffle has a flat inner and outer surface.

37. The acoustic radiator of claim 31 wherein the baffle has a shallow saucer shape with a bottom of the saucer extending toward the bottom of the basket.

38. The acoustic radiator of claim 31 is a passive radiator.

39. The acoustic radiator of claim 31 wherein the volume of air displaced by the baffle in either direction of travel, into or out of the basket, can be expressed by the following equation:

$$V = (\text{Area of the third dimensions}) \cdot X_{max}$$

where $X_{max}$ is the maximum travel distance of the baffle in either direction from the rest position.

40. The acoustic radiator of claim 39 wherein the volume of air displaced for a baffle with a circular outer edge, the equation is:

$$V = \pi \cdot R^2 \cdot X_{max} = \pi \cdot (C_d/2)^2 \cdot X_{max}$$

where R is the radius of the outer edge of the baffle, and $C_d$ is the diameter.

41. An acoustic wave production system comprising:

an acoustic enclosure having a top, sides and a bottom with the distance between the top and bottom providing a preselected depth to the enclosure and the top defining an opening therethrough with first dimensions in a first plane; and an acoustic radiator including:

a basket having a bottom and an open mouth each at opposite ends of equal length spaced apart struts to allow air flow through the basket, the mouth being defined by a flange of a first thickness extending outward, the bottom having second dimensions in a second plane and the flange of the mouth having third dimensions in a third plane, said first dimensions being greater than the second dimensions and said third dimensions being greater than the first dimensions, said first, second and third planes being substantially parallel to each other and said first plane and third plane spaced apart from each other by said first thickness;

a flexible surround having a preshaped portion between a first edge and a second edge, said first edge coupled to the flange with said second edge outside the mouth of the basket, in vertical alignment with the first edge of the surround and the flange; and a baffle defining an outer edge coupled to the second edge of the flexible surround with the outer edge of the baffle having fourth dimensions.

42. An improved method for mounting an acoustic baffle of an acoustic radiator to achieve a larger working area for radiating sound, the acoustic radiator also including a basket having a bottom and sides extending away from the bottom with upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other and a flexible surround with a preshaped portion between a first edge and a second edge, said method comprising the steps of:

a. mounting the first edge of the flexible surround to the upper edge of the basket;

b. orienting the second edge of the flexible surround outside the mouth of the basket, wherein the second edge of the surround is less than 70° from vertical relative to the second plane; and c. affixing an outer edge of the baffle to the second edge of the flexible surround with the outer edge of the baffle having third dimensions.

43. The acoustic radiator of claim 31 further includes:

a ring shaped magnet attached to the bottom of the basket, the magnet having a top and a bottom surface and a hole defined therethrough between the top and bottom surfaces;

magnetic field extenders on the top and bottom surfaces of the magnet with a portion of the bottom field extender extending upward into the hole;

a voice coil including a thin walled, tube of a non-magnetic material defining a central hole therethrough along a major axis of the tube, the tube also having a first end and a second end, the first end affixed to the baffle and an electrically conductive wire coil wound on the cylinder near the second end, the second end of the tube being passed over the upward extending portion of the bottom field extender with the tube being free to move up and down relative to the top and bottom surfaces of the magnet when an electrical signal is applied to the coil causing the baffle to move in response to the electrical signal.

44. The method of claim 42 wherein the surround provides equal resistance to movement of the baffle toward and away from the bottom of the basket.

45. The method of claim 42 wherein the volume of air displaced by the baffle in either direction of travel, into or out of the basket, can be expressed by the following equation:

$$V=(\text{Area of the third dimensions})\cdot X_{max}$$

where $X_{max}$ is the maximum travel distance of the baffle in either direction from a rest position.

46. An acoustic wave production system comprising:

an acoustic enclosure having a top, sides and a bottom with the distance between the top and bottom providing a preselected depth to the endosure and the top defining an opening therethrough with first dimensions in a first plane; and an acoustic radiator including:

a basket having a bottom and sides extending away from the bottom with the upper edge of the sides forming an open mouth, the bottom in a second plane and the mouth in a third plane, said second plane and third plane spaced apart from, and substantially parallel to, each other;

a flexible surround having a preshaped portion between a first edge and a second edge, said first edge coupled to the upper edge of the basket with said second edge spaced away from the first edge toward the center of the mouth of the basket, the preshaped portion extending outward from the third plane with the first edge including a mounting tab that extends beneath the preshaped portion and the second edge extending away from the preshaped portion; and a baffle defining an outer edge coupled to the second edge of the flexible surround.

47. An improved method for mounting an acoustic baffle of an acoustic radiator to achieve a larger working area for radiating sound, the acoustic radiator also including a basket having a bottom and sides extending away from the bottom with upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other and a flexible surround with a preshaped portion between a first edge and a second edge, said method comprising the steps of:

a. mounting the first edge of the flexible surround to the upper edge of the basket;

b. orienting the second edge of the flexible surround outside the mouth of the basket, in vertical alignment with the first edge of the surround and the upper edge of the sides of the basket; and c. affixing an outer edge of the baffle to the second edge of the flexible surround with the outer edge of the baffle having third dimensions.

48. The method of claim 47 wherein the surround provides equal resistance to movement of the baffle toward and away from the bottom of the basket.

49. The method of claim 47 wherein the third dimensions of the outer edge of the baffle are at least as large as the second dimensions of the mouth of the basket.

50. The method of claim 47 wherein the volume of air displaced by the baffle in either direction of travel, into or out of the basket, can be expressed by the following equation:

$$V=(\text{Area of the third dimensions})\cdot X_{max}$$

where $X_{max}$ is the maximum travel distance of the baffle in either direction from a rest position.

51. The method of claim 50 wherein the volume of air displaced for a baffle with a circular outer edge, the equation is:

$$V=\pi\cdot R^2\cdot X_{max}=\pi\cdot(C_d/2)^2\cdot X_{max}$$

where R is the radius of the outer edge of the baffle, and $C_d$ is the diameter.

52. The method of claim 45 wherein the volume of air displaced for a baffle with a circular outer edge, the equation is:

$$V=\pi\cdot R^2\cdot X_{max}=\pi\cdot(C_d/2)^2\cdot X_{max}$$

where R is the radius of the outer edge of the baffle, and $C_d$ is the diameter.

53. An improved method for mounting an acoustic baffle of an acoustic radiator to achieve a larger working area for radiating sound, the acoustic radiator also including a basket having a bottom and sides extending away from the bottom with upper edge of the sides forming an open mouth, the bottom having first dimensions in a first plane and the mouth having second dimensions in a second plane with said second dimensions being greater than said first dimensions and said first plane and second plane spaced apart from, and substantially parallel to, each other and a flexible surround with a preshaped portion between a first edge including a mounting tab that extends beneath the preshaped portion with the mounting tab and a second edge, said method comprising the steps of:

a. mounting the first edge mounting tab of the flexible surround to the upper edge of the basket;

b. spacing the second edge of the flexible surround away from the first edge extending radially toward the center of the mouth of the basket; and c. affixing an outer edge of the baffle to the second edge of the flexible surround with the outer edge of the baffle having third dimensions.

54. The method of claim 53 wherein the surround provides equal resistance to movement of the baffle toward and away from the bottom of the basket.

55. The method of claim 53 wherein the volume of air displaced by the baffle in either direction of travel, into or out of the basket, can be expressed by the following equation:

$$V=(\text{Area of the third dimensions})\cdot X_{max}$$

where $X_{max}$ is the maximum travel distance of the baffle in either direction from a rest position.

56. The method of claim 55 wherein the volume of air displaced for a baffle with a circular outer edge, the equation is:

$$V=\pi\cdot R^2\cdot X_{max}=\pi\cdot(C_d/2)^2\cdot X_{max}$$

where R is the radius of the outer edge of the baffle, and $C_d$ is the diameter.

* * * * *